US006876484B2

(12) United States Patent
Greywall (10) Patent No.: US 6,876,484 B2
(45) Date of Patent: Apr. 5, 2005

(54) DEFORMABLE SEGMENTED MEMS MIRROR

(75) Inventor: Dennis S. Greywall, Hunterdon, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/395,362

(22) Filed: Mar. 24, 2003

(65) Prior Publication Data

US 2004/0190110 A1 Sep. 30, 2004

(51) Int. Cl.$^7$ .................................................. G02B 26/00
(52) U.S. Cl. ...................................... 359/291; 359/223
(58) Field of Search ................................. 359/291, 290, 359/292, 223, 274, 230, 320, 850, 224

(56) References Cited

U.S. PATENT DOCUMENTS

| | | | | |
|---|---|---|---|---|
| 4,954,789 A | * | 9/1990 | Sampsell | 359/318 |
| 5,062,689 A | | 11/1991 | Koehler | 359/230 |
| 5,501,893 A | | 3/1996 | Laermer et al. | 428/161 |
| 5,508,841 A | * | 4/1996 | Lin et al. | 359/318 |
| 5,629,790 A | | 5/1997 | Neukermans et al. | 359/198 |
| 5,745,281 A | | 4/1998 | Yi et al. | 359/290 |
| 5,808,780 A | * | 9/1998 | McDonald | 359/290 |
| 5,978,128 A | * | 11/1999 | Yoon | 359/298 |
| 6,175,443 B1 | * | 1/2001 | Aksyuk et al. | 359/291 |
| 6,201,631 B1 | | 3/2001 | Greywall | 359/245 |
| 6,220,561 B1 | | 4/2001 | Garcia | 310/309 |
| 6,229,640 B1 | | 5/2001 | Zhang | 359/290 |
| 6,404,969 B1 | | 6/2002 | Tayebati et al. | 385/140 |
| 6,467,345 B1 | * | 10/2002 | Neukermans et al. | 73/504.02 |
| 6,618,184 B2 | * | 9/2003 | Jin et al. | 359/291 |
| 2002/0005976 A1 | | 1/2002 | Behin et al. | 359/254 |

* cited by examiner

*Primary Examiner*—Hung Xuen Dang
*Assistant Examiner*—Tuyen Tra (57) ABSTRACT

A MEMS device having a deformable segmented mirror. The mirror includes a plurality of movable segments supported on a substrate using spring vertices, each vertex having a fixed plate and one or more springs. In a representative embodiment, three springs support each movable segment, where each spring connects the movable segment to a different spring vertex. The MEMS device also has a plurality of electrodes, each of which can be individually biased. A movable segment moves in response to a voltage applied to an electrode located beneath that segment while the deformed springs attached to the segment provide a restoring force. Due to the fixed plates, motion of each movable segment is substantially decoupled from that of the adjacent segments, which makes the shape of the segmented mirror relatively easy to control. In addition, segments in a deformable mirror of the invention can be displaced by a distance that is significantly larger than the maximum deformation amplitude for a membrane mirror of the prior art. The MEMS device can be fabricated using two silicon-on-insulator (SOI) wafers and an etch fabrication technique.

22 Claims, 9 Drawing Sheets

DEFORMABLE SEGMENTED MEMS MIRROR

BACKGROUND OF THE INVENTION

1. Field of the Invention

The present invention relates to adaptive optics and, more specifically, to micro-electromechanical systems (MEMS) for implementing adaptive optics.

2. Description of the Related Art

Adaptive optics is a field of optics dedicated to the improvement of optical signals using information about signal distortions introduced by the environment in which the optical signals propagate. An excellent introductory text on the subject is given in "Principles of Adaptive Optics" by R. K. Tyson, Academic Press, San Diego, 1991, the teachings of which are incorporated herein by reference.

A representative example of an adaptive optical element is a deformable mirror driven by a wavefront sensor and configured to compensate for atmospheric distortions that affect telescope images. Small naturally occurring variations in temperature (~1° C.) in the atmosphere cause random turbulent motion of the air and give rise to changes in the atmospheric density and, hence, to the index of refraction. The cumulative effect of these changes along the beam propagation path may lead to beam wandering and spreading and to beam intensity fluctuations, each of which degrades image quality. The wavefront sensor is a device that measures the distortions introduced in the atmosphere and generates feedback for the deformable mirror. Based on the feedback, the mirror is deformed such that the beam distortions are significantly reduced, thus improving the image quality.

A typical deformable mirror of the prior art is a deformable membrane, the shape of which is controlled by an array of underlying electrostatic actuators, e.g., electrodes. However, because each electrode affects the shape of the entire membrane, the shape of the membrane is difficult to control. In addition, the maximum deformation amplitude for a typical membrane mirror is on the order of 1 $\mu$m, which puts a corresponding limit on the range of wavefront distortions correctable with that membrane mirror. As a result, prior art membrane mirrors can primarily be used for correcting only relatively small distortions.

SUMMARY OF THE INVENTION

The problems in the prior art are addressed, in accordance with the principles of the present invention, by a MEMS device having a deformable segmented mirror. The mirror includes a plurality of movable segments, each segment supported by springs and adjustably positionable offset from a substrate. Each spring is connected at one end to one of the movable segments and at the other end to a stationary plate fixedly offset from the substrate. In one embodiment of the invention, each stationary plate is rigidly attached to a post that supports that plate above the substrate. In a representative embodiment, three springs support each movable segment, and each spring connected to a particular movable segment connects that movable segment to a different respective stationary plate. The MEMS device also has a plurality of electrodes, each of which can be individually biased. A movable segment moves in response to a voltage applied to an electrode located beneath that segment while the springs attached to the segment provide a restoring force when they are stretched from their rest positions by motion of the movable segment to which they are attached. Due to the stationary plates, motion of each movable segment is substantially decoupled from that of the adjacent segments, which makes the shape of the segmented mirror relatively easy to control. In addition, segments in a deformable mirror of the invention can be displaced by a distance that is significantly larger than the maximum deformation amplitude for a membrane mirror of the prior art. The MEMS device can be fabricated using two silicon-on-insulator (SOI) wafers and an etch fabrication technique.

In accordance with one aspect of the invention, exemplary MEMS devices which embody the principles of the invention may be fabricated using two wafers. A plurality of segments, a plurality of spring vertices, a plurality of posts, and a grid structure are formed using a first wafer such that the grid structure is adjacent to the segments and spring vertices; and a plurality of electrodes is formed using a second wafer. The first and second wafers are then bonded together using the grid structure to transfer pressure to the termini of the posts to attach them to the second wafer. After the bonding, the grid structure is removed to release the segments and spring vertices. Alternatively, the plurality of posts may be formed on the second (electrode) wafer and then similarly attached to the plurality of spring vertices formed on the first wafer.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
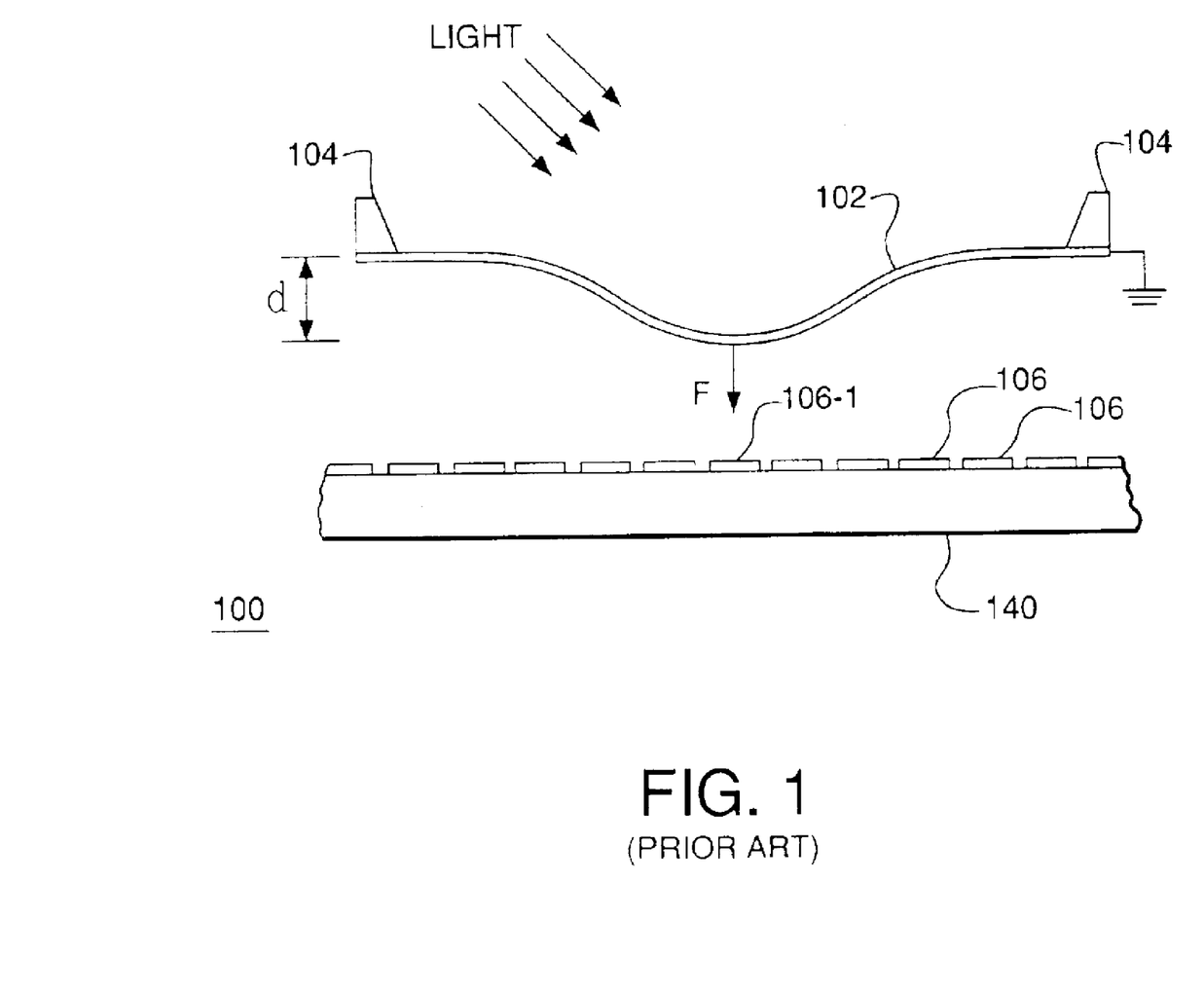
FIG. 1 schematically shows a cross section of a deformable membrane mirror of the prior art.

FIG. 1 schematically shows a deformable membrane mirror 100 of the prior art. Mirror 100 includes (i) a deformable membrane 102 mounted on a support structure 104 and (ii) an array of electrodes 106 located beneath membrane 102 on a substrate 140. Each electrode 106 can be individually biased by applying a voltage differential between that electrode and membrane 102 (typically at ground potential). For example, when electrode 106-1 is biased, an attractive electrostatic force (F) is exerted between that electrode and membrane 102 causing the membrane, initially flat, to deform into the shape indicated in FIG. 1.

As shown in FIG. 1, biasing electrode 106-1 affects not only the membrane area directly above that electrode, but also other areas of membrane 102. This behavior, termed "intra-mirror crosstalk," limits the controllability of mirror 100. In addition, the maximum deformation amplitude (d) for membrane 102 is typically on the order of 1 $\mu$m, which puts a corresponding limit on the range of wavefront distortions correctable with mirror 100. It is therefore desirable to have a deformable mirror that has a greater deformation range than mirror 100 and is substantially free of intra-mirror crosstalk.

Figure 2A:
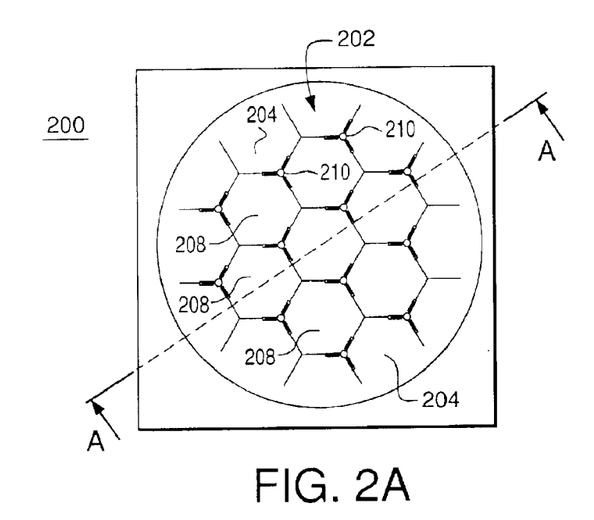
FIGS. 2A–D schematically illustrate a MEMS device including a deformable segmented mirror according to one embodiment of the invention.
Figure 2B:
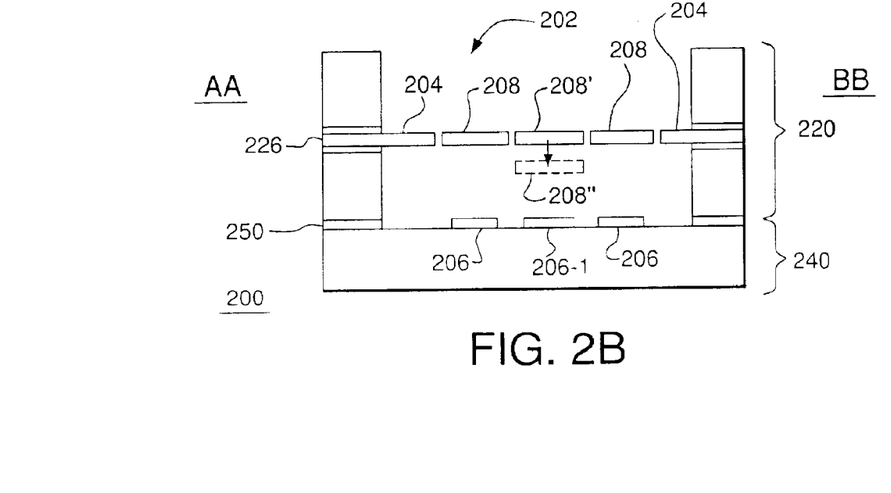
Figure 2C:
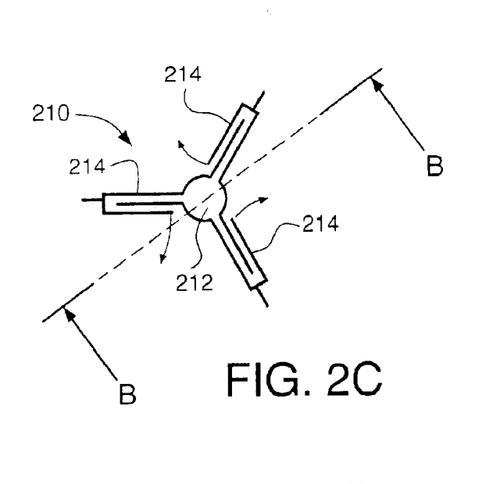
Figure 2D:
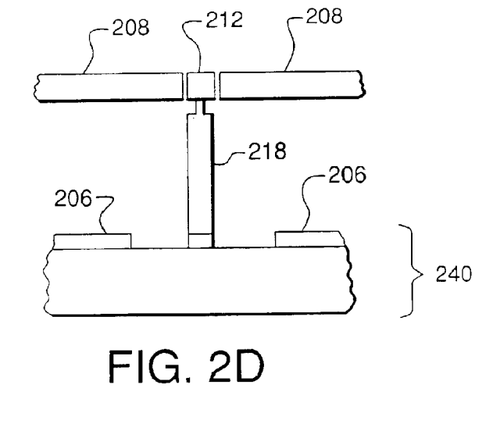

FIGS. 2A–D schematically illustrate a MEMS device 200 including a deformable segmented mirror 202 according to one embodiment of the present invention. More specifically, FIG. 2A shows a top view of device 200; FIG. 2B is a cross-sectional view of device 200 along the plane designated AA in FIG. 2A; FIG. 2C shows a top view of a spring vertex portion of device 200; and FIG. 2D is a cross-sectional view of the spring vertex portion along the plane designated BB in FIG. 2C. As will be explained below, segmented mirror 202 has significantly lower intra-mirror crosstalk than mirror 100. In addition, individual segments of mirror 202 can be displaced up to about 10 $\mu$m providing a greater deformation range for mirror 202 compared to that of mirror 100.

Referring to FIGS. 2A–B, device 200 is preferably fabricated using two multilayered wafers 220 and 240, which are bonded together. Wafer 220 includes segmented mirror 202 having a plurality of hexagonal movable segments 208 and fixed segments 204, with both segment types formed in layer 226 of that wafer. Illustratively, 7 movable segments 208 (i.e., the center segment and 6 intermediate segments) and 12 fixed segments 204 (surrounding the movable segments) are shown in FIG. 2A. Wafer 240 includes a plurality of electrodes 206 formed in layer 250 of that wafer. In one embodiment, device 200 has one electrode 206 for each segment 208.

FIG. 2C shows an enlarged top view of a spring vertex 210, twelve of which are used in device 200. Each of 7 movable segments 208 is supported by three different spring vertices 210 (FIG. 2A). Each spring vertex 210 includes an immobile center plate 212 and three springs 214. Center plate 212 is rigidly attached to a post 218, which supports that plate above wafer 240 in a fixed position as shown in FIG. 2D. Depending on the location of individual spring vertex 210 within device 200, each spring 214 of that vertex is attached between plate 212 and either a movable segment 208 or a fixed segment 204, with the three different springs 214 of the vertex connected to three different segments. In an alternative embodiment, each spring 214 connected between a plate 212 and a fixed segment 204 in FIGS. 2A–B is removed from the design of the corresponding spring vertex 210 thereby reducing the number of springs 214 in that spring vertex to one or two, depending on the position of the spring vertex.

In one embodiment, each spring 218 in each vertex 210 is a U-shaped spring as shown in FIG. 2C, where the black lines indicate the slits defining vertex 210 in layer 226. For each spring 218 in FIG. 2C, the corresponding arrow points towards the segment 208 to which that spring is attached. Springs 218 are designed to enable deflection of each segment 208 out of the plane of layer 226, which deflection, in general, may include both translational and rotational motion of the segment.

Motion of each movable segment 208 is induced using electrode 206 located beneath that segment. For example, when a voltage differential is applied between electrode 206-1 (FIG. 2B) and mirror 202, an attractive electrostatic force is exerted between that electrode and segment 208' causing the latter to move to an equilibrium position indicated by the dashed line and labeled 208" in FIG. 2B. In the equilibrium position, the electrostatic force generated by electrode 206-1 and the spring restoring forces of deformed springs 214 connected to segment 208' compensate each other.

Due to the rigidly supported center plates 212, motion of each individual segment 208 is decoupled from that of adjacent segments 208. For example, when selected segment 208 is displaced, only springs 214 connected to that particular segment are deformed while springs 214 connected to the adjacent segments are not deformed. As a result, different segments 208 can move independently of each other, thus significantly reducing intra-mirror crosstalk in mirror 202 compared to that in prior art mirror 100. However, electrodes 206 other than the electrode located directly beneath a particular segment 208 (i.e., adjacent electrodes), when biased, may still cause motion of that particular segment. For example, if segment 208 is already deflected, biasing an adjacent electrode 206 may affect that deflection. Similarly, if segment 208 is not deflected, biasing an adjacent electrode 206 may introduce a small deflection. These additional deflections may involve translation or rotation or both. To reduce these effects, in one implementation of device 200, the size of electrodes 206 is significantly smaller than the size of segments 208. This increases the effective distance between each particular electrode 206 and segments 208 other than the segment located directly above that electrode. Since the electrostatic force decreases as the distance increases, the intra-mirror crosstalk is further reduced.

In a preferred implementation, each electrode 206 is aligned relative to the corresponding segment 208 such that the surface of the segment remains substantially parallel to the plane of layer 226 when the electrode is biased and the segment is moved, i.e., the segment is translated substantially along its outer surface normal. Therefore, shapes assumed by mirror 202 are produced by translation of different segments 208. A desired shape of mirror 202 is obtained by applying appropriate voltages to different electrodes 206 to translate segments 208 to their desired positions.

Figure 3A:
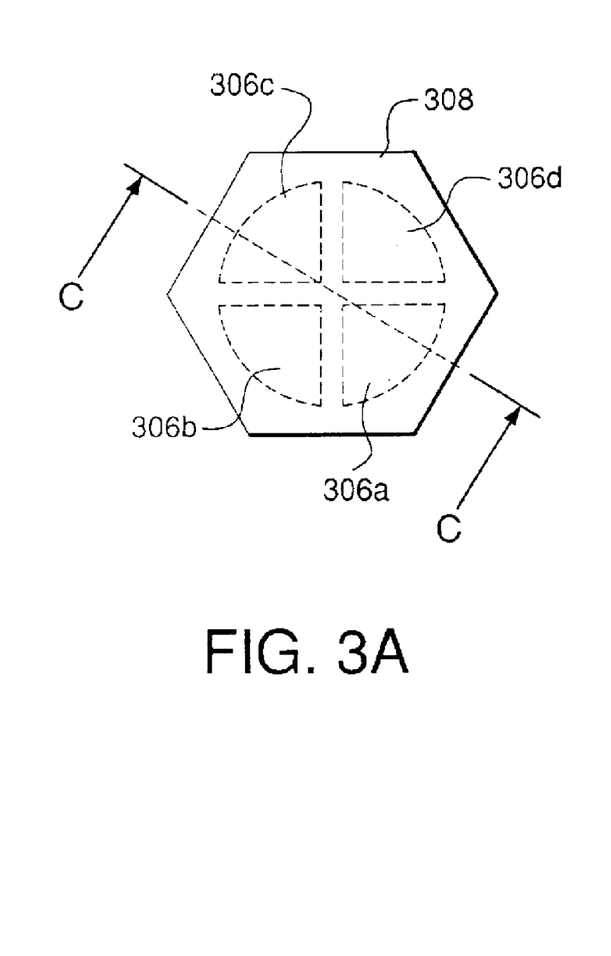
FIGS. 3A–B schematically illustrate an actuator for a movable segment that can be used in a device similar to the device shown in FIG. 2 according to one embodiment of the invention.
Figure 3B:
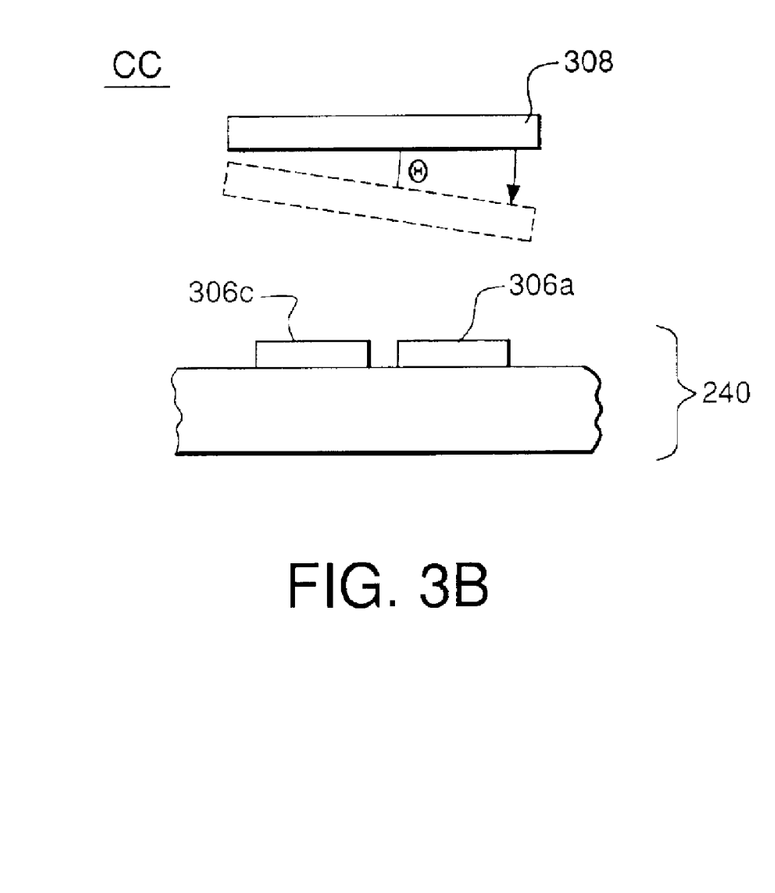

FIGS. 3A–B schematically illustrate an actuator for a movable segment 308 that can be used in a device similar to device 200 according to an alternative embodiment of the invention. More specifically, FIG. 3A schematically shows a top view of segment 308, and FIG. 3B is a cross-sectional view of the actuator for segment 308 along the plane designated CC in FIG. 3A. As indicated in FIG. 3A, there are four sector-shaped electrodes 306a–d located beneath segment 308, each of which electrodes can be individually biased. A purpose of having more than one actuating electrode for segment 308 is to be able to controllably tilt as well as translate that segment. For example, when equal voltages are applied to all four electrodes 306, segment 308 is translated similar to segments 208. However, when different voltages are applied to two or more different electrodes 306 (e.g., electrodes 306a and 306c), segment 308 is translated and tilted (rotated) as indicated by the dashed line in FIG. 3B. The tilt angle and direction depend on the voltage differences between different electrodes 306. For example, tilt angle θ (FIG. 3B) will increase as the voltage difference between electrodes 306a and 306c increases.

Figure 4A:
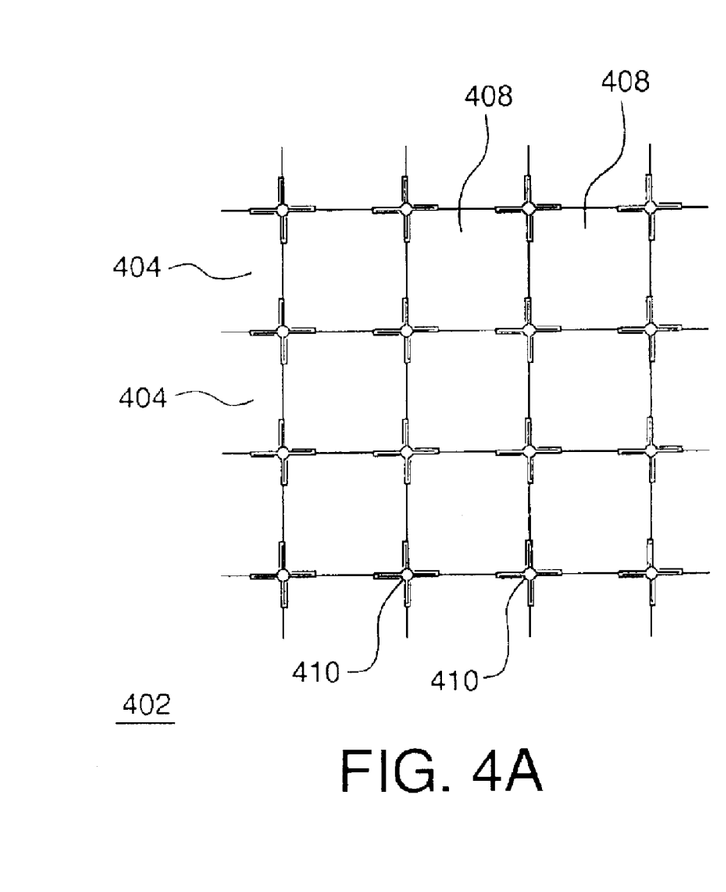
FIGS. 4A–B schematically illustrate a segmented mirror that can be used in a device similar to the device shown in FIG. 2 according to one embodiment of the invention.
Figure 4B:
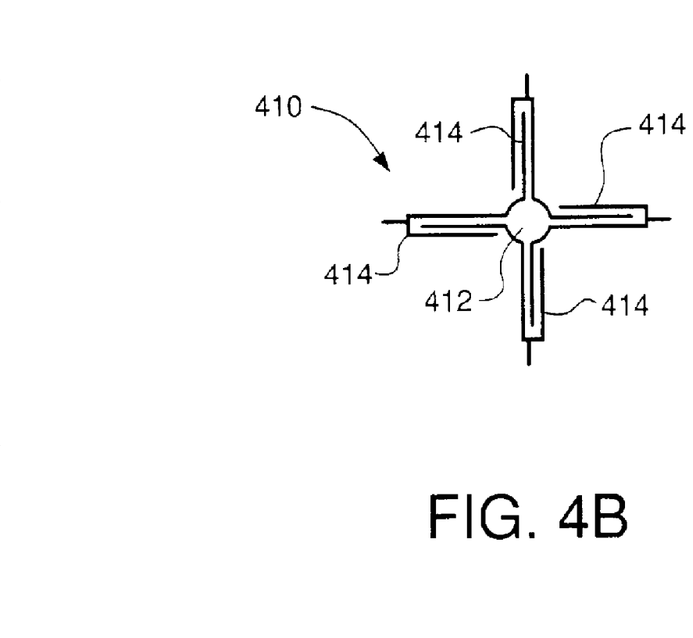

FIGS. 4A–B schematically illustrate a segmented mirror 402 that can be used in a device similar to device 200 according to yet another embodiment of the invention. More specifically, FIGS. 4A–B show top views of mirror 402 and a spring vertex 410 of that mirror, respectively. Mirror 402 is similar to mirror 202 (FIGS. 2A and 2C), with one difference between those mirrors being the shape of their respective segments and spring vertices. In particular, each spring vertex 410 has four springs 414. Similar to spring vertex 210, spring vertex 410 includes an immobile center plate 412 with each of springs 414 connected between that plate and a corresponding square movable segment 408 or fixed segment 404. As can be appreciated by one skilled in the art, in different embodiments, differently shaped segments and/or spring vertices may similarly be used including, without limitation, rectangular segments connected to four spring vertices, triangular segments connected to three spring vertices, and any other suitably shaped segments arranged in a pattern providing contiguous coverage for the mirror.

As already indicated above, device 200 (FIG. 2) is preferably fabricated using two multilayered wafers 220 and 240. In one embodiment, wafers 220 and 240 are first processed separately to form the corresponding structural elements for device 200. The wafers are then aligned with respect to each other and bonded together using, for example, a glue or fusion bonding. In the following, representative fabrication steps of wafer 220 are described first (FIG. 5), followed by the description of representative fabrication steps of wafer 240 (FIG. 6) and the bonding of the two fabricated wafers (FIG. 7).

FIGS. 5A–H schematically illustrate representative fabrication steps of wafer 220 of device 200 according to one embodiment of the invention. More specifically, FIGS. 5A, 5C, 5E, and 5G show area views (top views in FIGS. 5A, 5C, and 5E and a bottom view in FIG. 5G) of wafer 220 during those fabrication steps, whereas FIGS. 5B, 5D, 5F, and 5H show the corresponding cross-sectional views along the plane designated DD in the area view figures.

Figure 5A:
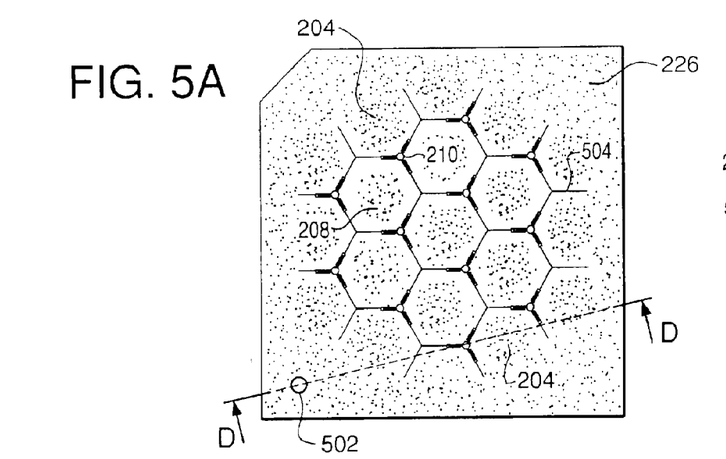
FIGS. 5A–H schematically illustrate representative fabrication steps of the first wafer of the device shown in FIG. 2 according to one embodiment of the invention.
Figure 5B:
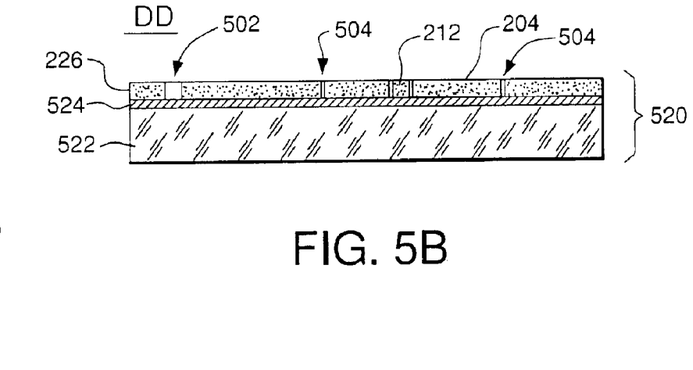

Referring to FIGS. 5A–B, in one embodiment, fabrication of wafer 220 begins with a silicon-on-insulator (SOI) wafer 520 having (i) two silicon layers, i.e., substrate layer 522 and overlayer 226 (see also FIG. 2B), and (ii) an insulating silicon oxide layer 524, which electrically isolates overlayer 226 from substrate layer 522. Segments 204 and 208 and spring vertices 210 are defined in overlayer 226 of wafer 520 using grooves 504. Also, an opening 502 for a future via structure is formed preferably close to an edge of wafer 520. Both grooves 504 and opening 520 may be formed using reactive etching, which stops at layer 524.

Figure 5C:
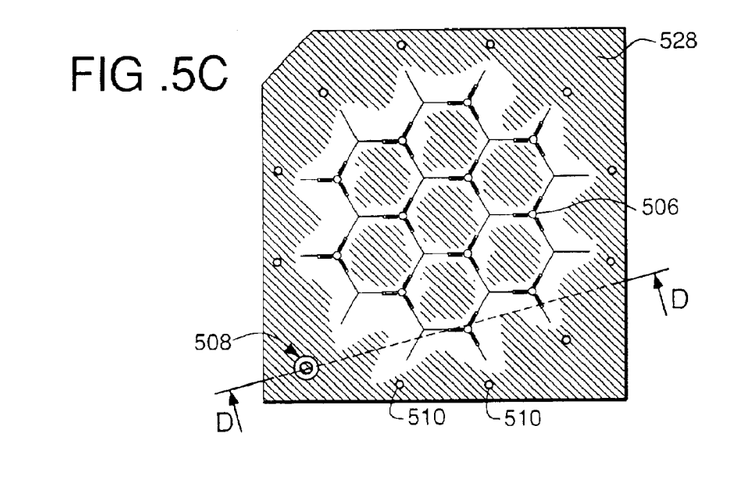
Figure 5D:
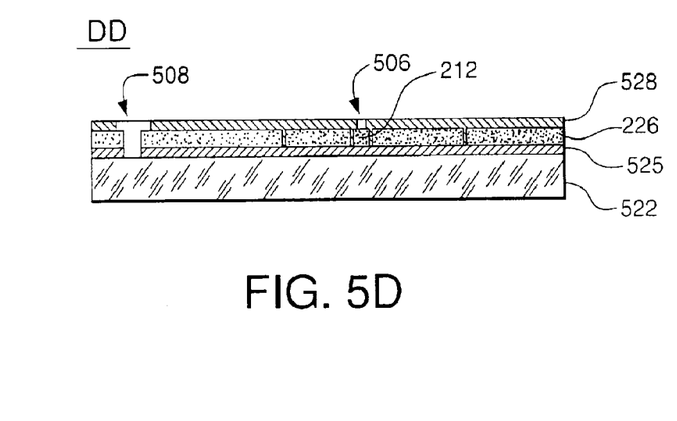

Referring to FIGS. 5C–D, first, a thin silicon oxide layer 528 is deposited onto overlayer 226 of wafer 520. Layer 528 is then patterned and etched to form openings 506, 508, and 510. Openings 506 are formed above center plates 212 of spring vertices 210 to accommodate posts 218 (not yet formed) and to connect those posts to center plates 212 of spring vertices 210. Opening 508 includes opening 502 and protrudes through oxide layers 524 and 528 and silicon layer 226. Openings 510 are formed to accommodate additional via structures (not yet formed). The processing illustrated in FIGS. 5C–D can be implemented using reactive etching, which stops at silicon layers 226 and 522.

Figure 5E:
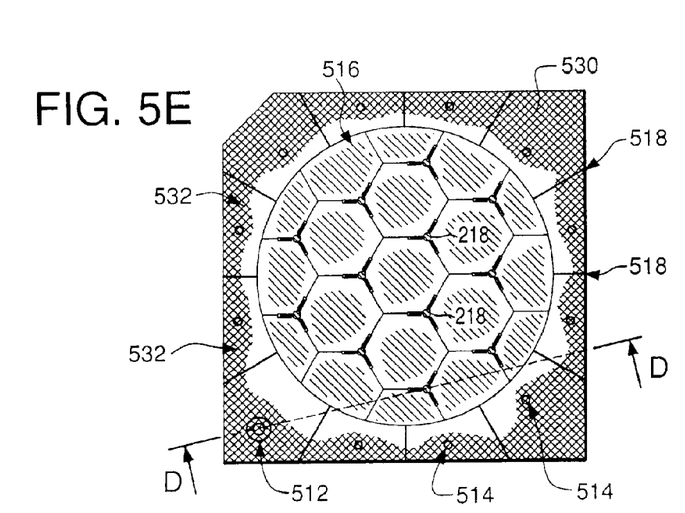
Figure 5F:
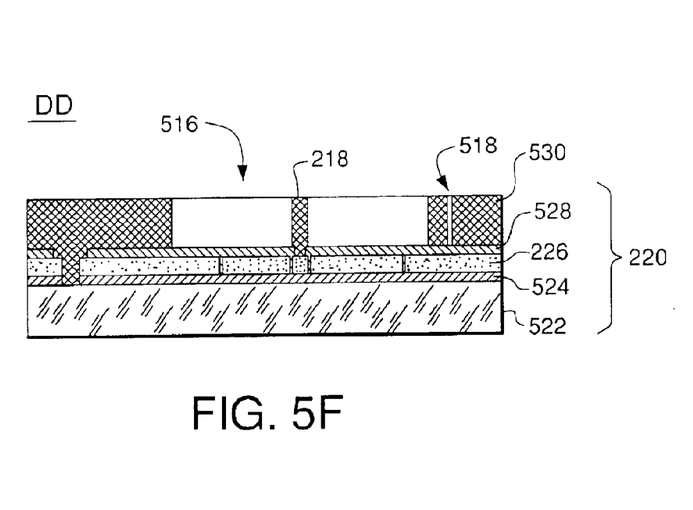

Referring to FIGS. 5E–F, first, a relatively thick doped poly-silicon layer 530 is deposited over oxide layer 528. During deposition, poly-silicon also fills openings 506, 508, and 510. The filling of opening 508 forms via structure 512, which provides electrical contact between layers 522, 226, and 530. The filling of each opening 510 forms a corresponding via structure 514. Poly-silicon layer 530 is then patterned and etched to form trenches 518 and posts 218 within an opening 516. Trenches 518 define sectors 532 in poly-silicon layer 530, which serve to reduce possible warping of wafer 220 due to mismatch in thermal expansion properties of different layers of that wafer. Each sector 532 has at least one via structure 514, which provides electrical contact between the sector and silicon layer 226. Thus, via structure 512 and the plurality of via structures 514 provide electrical contact between various structures in different silicon layers of wafer 220 (i.e., layers 522, 226, and 530) to provide, for example, grounding for those structures to avoid accumulation of static charge during operation of device 200.

Figure 5G:
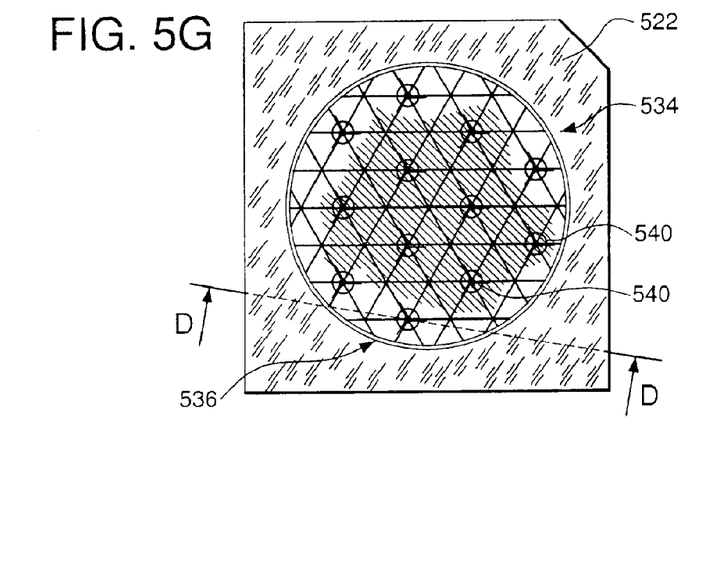
Figure 5H:
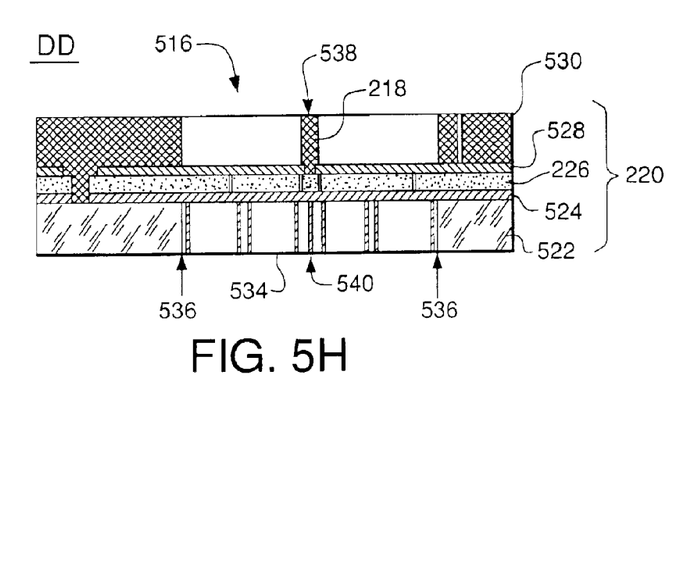

Referring to FIGS. 5G–H, substrate layer 522 is patterned and etched to form an open grid structure 534 covering the active area of deformable mirror 202. A circular groove 536 separates grid structure 534 from the rest of substrate layer 522 such that the grid structure can be removed from wafer 220 after wafers 220 and 240 are bonded together. One purpose of having grid structure 534 is to provide a capability to flex the area of layers 524, 226, and 528 adjacent to opening 516 (FIG. 5H) such that pressure is transferred to termini 538 of posts 218 to ensure proper bonding of the posts to wafer 240 during the bonding step of the fabrication process. Grid structure 534 has a plurality of circular hubs 540, each hub corresponding to a different post 218. During the bonding step, each hub 538 may serve as a pressure application point that efficiently transfers pressure to corresponding post 218.

Figure 6A:
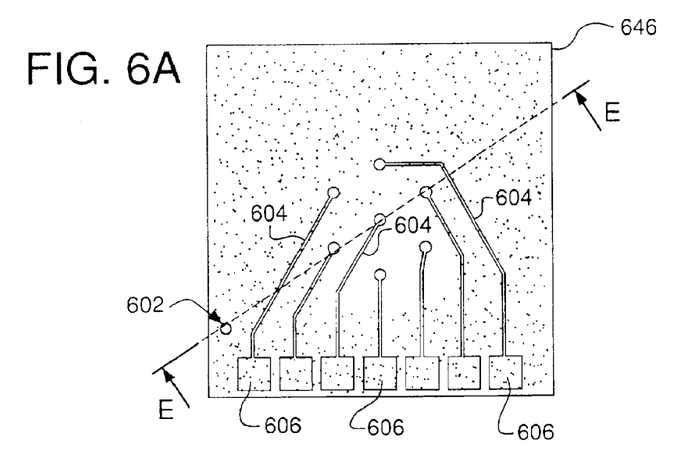
FIGS. 6A–F schematically illustrate representative fabrication steps of the second wafer of the device shown in FIG. 2 according to one embodiment of the invention.
Figure 6B:
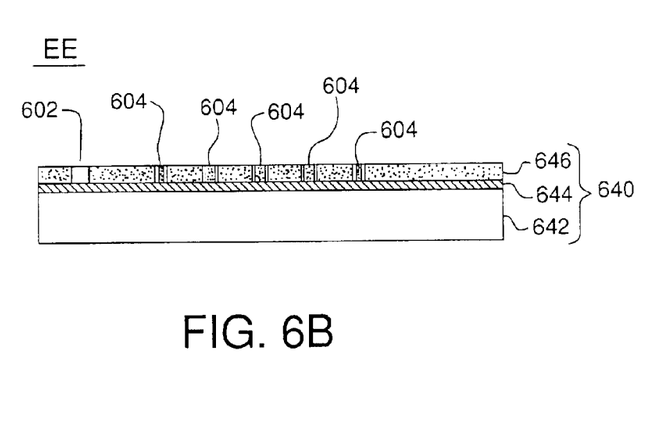
Figure 6C:
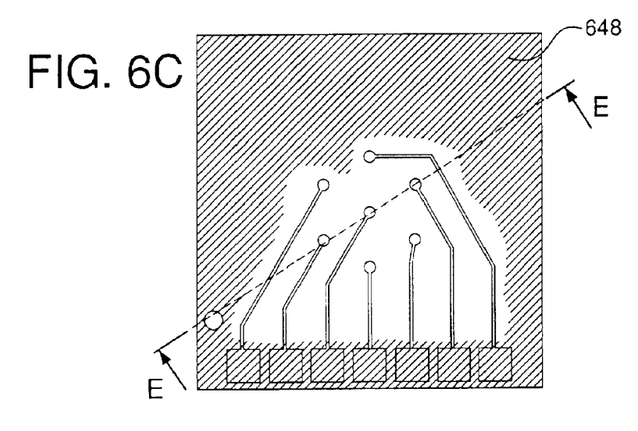
Figure 6D:
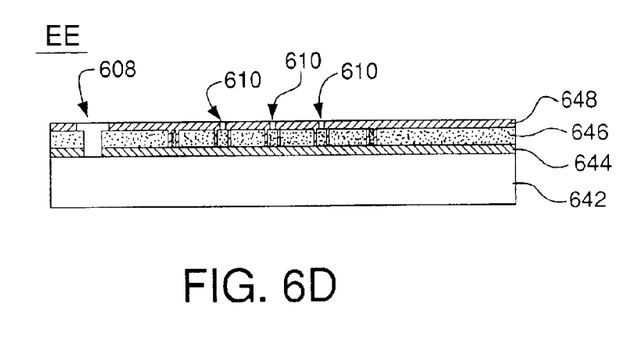
Figure 6E:
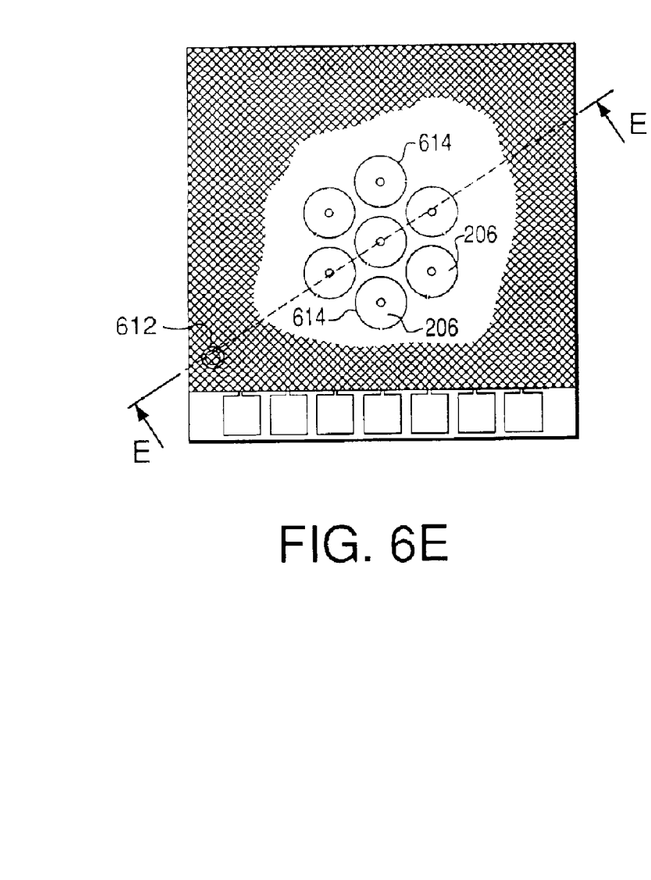
Figure 6F:
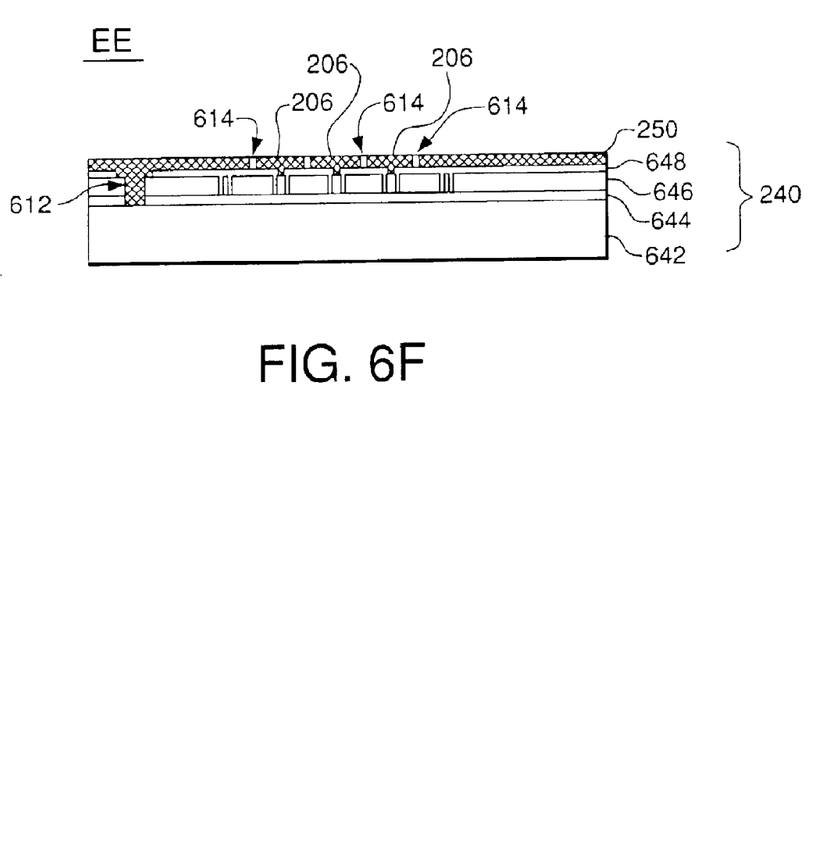
Figure 7:
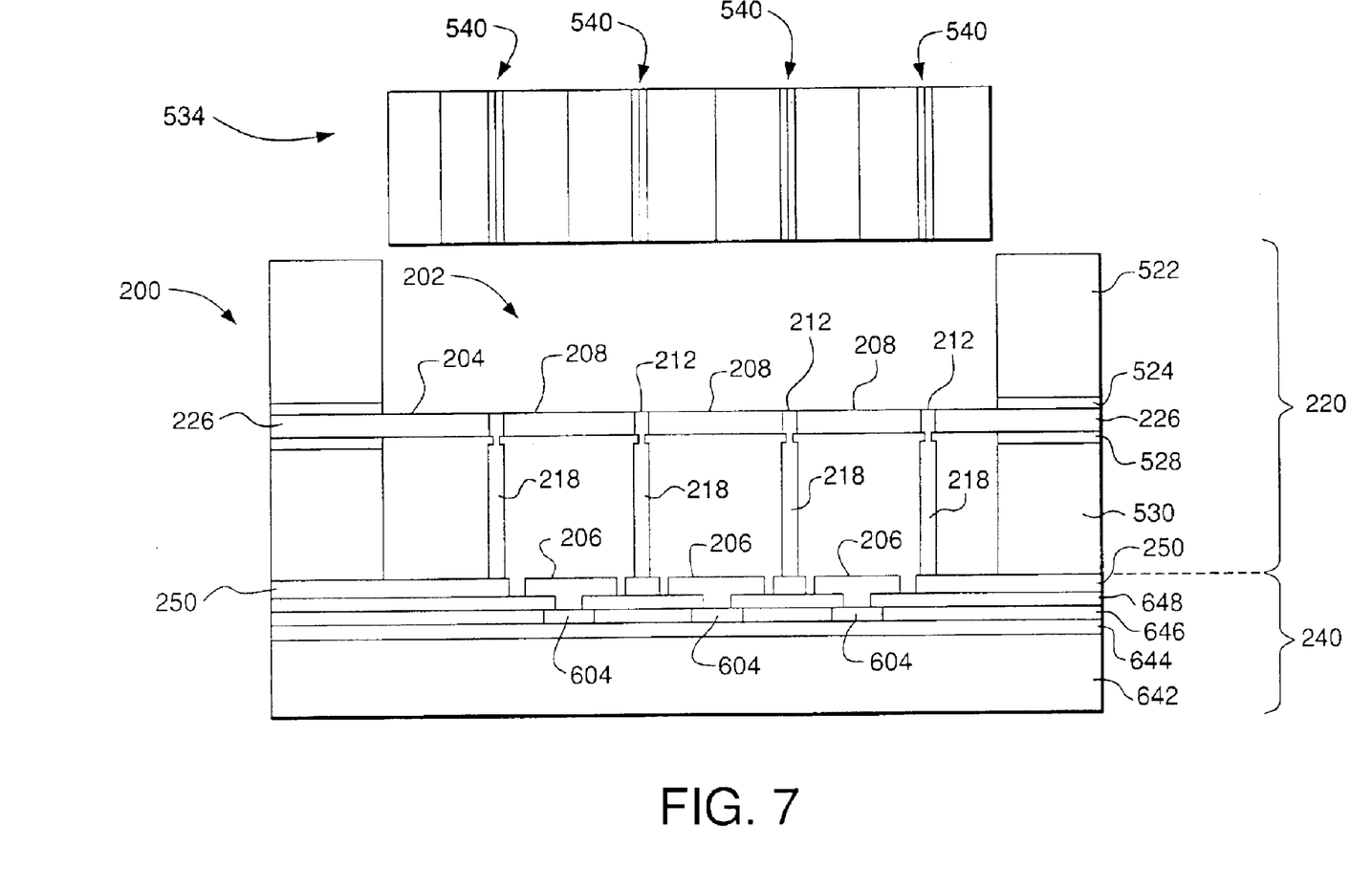
FIG. 7 schematically illustrates the step of bonding the first and second wafers to form the device shown in FIG. 2 according to one embodiment of the present invention.

FIGS. 6A–F schematically illustrate representative fabrication steps of wafer 240 of device 200 according to one embodiment of the invention. More specifically, FIGS. 6A, 6C, and 6E show top views of wafer 220 during those fabrication steps, whereas FIGS. 6B, 6D, and 6F show the corresponding cross-sectional views along the plane designated EE in the top view figures.

Referring to FIGS. 6A–B, in one embodiment, fabrication of wafer 240 begins with an SOI wafer 640, which is similar to wafer 520 of FIG. 5B. Wafer 640 has a silicon substrate layer 642, an insulating silicon oxide layer 644, and a silicon overlayer 646. Contact pads 606 and conducting tracks 604 are defined by etching narrow grooves in overlayer 646 of wafer 640. The grooves and insulation of underlying oxide layer 644 electrically isolate each connected pad 606/track 604 pair from the rest of the wafer such that different bias voltages can be applied to different contact pads/conducting tracks. Also, an opening 602 for a future via structure similar to structure 512 (FIG. 5F) is formed preferably close to an edge of wafer 640.

Referring to FIGS. 6C–D, first, a thin silicon oxide layer 648 is deposited onto overlayer 646 of wafer 640. Layer 648 is then patterned and etched to form openings 608 and 610. Opening 608 includes opening 602 and protrudes through oxide layers 644 and 648 and silicon layer 646. Openings 610 are formed above terminal portions of conducting tracks 604 such that each track 604 can be connected to corresponding electrode 206 (not yet formed).

Referring to FIGS. 6E–F, first, a thin, doped poly-silicon layer 250 (see also FIG. 2B) is deposited over oxide layer 648. During deposition, poly-silicon also fills openings 608 and 610 of FIG. 6D. The filling of opening 608 forms via structure 612, which provides electrical contact between layers 642, 646, and 250. Poly-silicon layer 250 is then patterned and etched to form trenches 614, which define electrodes 206 and electrically isolate those electrodes from the rest of layer 250. The filling of each opening 610 electrically connects corresponding electrode 206 to underlying conducting track 604. As a result, each electrode 206 can be individually biased by applying a desired voltage to the corresponding contact pad 606.

FIG. 7 schematically illustrates the step of bonding wafer 220 shown in FIG. 5H to wafer 240 shown in FIG. 6F according to one embodiment of the present invention. A layer of polyimide glue (not shown) is deposited over poly-silicon layer 250 of wafer 240 and patterned to match the contact area of wafers 220 and 240. For example, glue disks are formed at points where termini 538 of posts 218 are to be attached to layer 250. Wafer 220, as shown in FIG. 5H, is flipped over such that poly-silicon layer 530 of wafer 220 faces poly-silicon layer 250 of wafer 240. Wafers 220 and 240 are then aligned with respect to each other and joined such that posts 218 make contact with the corresponding glue disks. Pressure is applied to hubs 540 of grid structure 534 to ensure good bonding of posts 218 to layer 250. After the glue is cured and the two wafers become bonded, portions of layers 524 and 528 adjacent to the active area of mirror 202 are etched away to release movable segments 208 and detach grid structure 534. Grid structure 534 is then removed as shown in FIG. 7. A thin layer of metal (not shown), e.g., gold, is optionally deposited over movable segments 208 for better reflectivity and/or over contact pads 606 for better electrical conductivity.

Different etching techniques may be used to fabricate device 200 from initial SOI wafers. It is known that silicon etches significantly faster than silicon oxide using, e.g., reactive ion etching (RIE). Similarly, silicon oxide etches significantly faster than silicon using, e.g., fluorine-based etchants. Relatively high aspect ratio elements, such as walls and hubs in grid structure 534, may be defined using a standard, anisotropic etching technique, such as deep RIE. Deep RIE stops automatically at an oxide layer (e.g., layer 524) acting as an etch stop.

Additional layers of material (e.g., layers 528, 530, 648, and 250, FIGS. 5 and 6) may be deposited onto an SOI wafer using, e.g., chemical vapor deposition. Various parts of the MEMS device may be mapped onto the corresponding layers using lithography. Current lithographic techniques are capable of defining details whose size is as small as about 0.25 microns. Additional description of various fabrication steps may be found in U.S. Pat. Nos. 6,201,631, 5,629,790, and 5,501,893, the teachings of which are incorporated herein by reference.

In a representative implementation, layer thicknesses and element sizes may be as follows: 300 $\mu$m for layer 522, 0.5 $\mu$m for layer 524, 1 $\mu$m for layer 226, 0.5 $\mu$m for layer 528, 20 $\mu$m for layer 530, 300 $\mu$m for layer 642, 0.5 $\mu$m for layer 644, 1 $\mu$m for layer 646, 0.5 $\mu$m for layer 648, 1 $\mu$m for layer 250, about 100 $\mu$m for segment 208, about 50 $\mu$m for electrode 206, 50×2 $\mu$m (length×width) for spring 214, and 20 $\mu$m (diameter) for post 218.

Although fabrication of MEMS devices of the invention has been described in the context of using silicon/silicon oxide SOI wafers, other suitable materials, such as germanium-compensated silicon, may similarly be used. The materials may be appropriately doped as known in the art. Various surfaces may be modified, e.g., by metal deposition for enhanced reflectivity and/or electrical conductivity or by ion implantation for enhanced mechanical strength. Differently shaped segments, spring vertices, posts, sectors, electrodes, and/or grid structures may be implemented without departing from the scope and principle of the invention. Spring vertices may include different springs, where the term "spring" refers in general to any suitable elastic structure that can recover its original shape after being distorted. Furthermore, a different layout for conducting tracks may be realized as necessary and/or apparent to a person skilled in the art.

While this invention has been described with reference to illustrative embodiments, this description is not intended to be construed in a limiting sense. For example, a deformable segmented mirror of the invention may be implemented using a different number and layout of movable and fixed segments. At least two movable segments of the deformable segmented mirror may have different shapes and/or sizes. Although MEMS devices the invention have been described in the context of electrostatic actuation, other forms of actuation, for example, mechanical or electromagnetic, can also be used. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A MEMS device, comprising a plurality of movable segments, each segment supported by springs and positioned offset from a substrate by an offset distance, wherein:
   each spring is attached between a corresponding stationary structure and a corresponding movable segment, said stationary structure fixed with respect to the substrate;
   each movable segment is adapted to move with respect to the substrate to change the offset distance;
   at least one movable segment has a hexagonal shape; and
   exactly three springs are attached to the at least one movable segment such that each of the three said springs is attached to a different stationary structure.

2. The device of claim 1, wherein the stationary structure rests upon a post supporting said stationary structure on the substrate.

3. The device of claim 1, wherein:
   for each movable segment, the device includes a first electrode;
   each movable segment is adapted to translate in response to a first voltage applied between the corresponding first electrode and the movable segment, wherein the translation changes the offset distance.

4. The device of claim 3, wherein:
   for at least one movable segment, the device includes a second electrode;
   the at least one movable segment is adapted to translate and rotate in response to one or more voltages applied between one or more of the first and second electrodes and the at least one movable segment.

5. The device of claim 1, wherein:
   the plurality of movable segments and the springs are formed using a first wafer; and
   a second wafer comprises the substrate.

6. The device of claim 1, wherein:
   the plurality of movable segments are arranged in a substantially contiguous pattern; and
   each movable segment has a reflective coating to form a deformable mirror over the contiguous pattern, wherein each movable segment is adapted to move substantially independent of every other movable segment.

7. The device of claim 1, wherein the at least one movable segment is adapted to tilt in any selected direction with respect to a plane defined by said segment at a rest position.

8. The device of claim 7, wherein:
for the at least one movable segment, the device includes at least three electrodes; and
the tilt direction is selected by application of one or more voltages between one or more of the at least three electrodes and the at least one movable segment.

9. A method of fabricating a MEMS device, comprising:
forming a plurality of movable segments, each segment supported by springs and positioned offset from a substrate by an offset distance, wherein:
each spring is attached between a corresponding stationary structure fixedly supported on the substrate and a corresponding movable segment; and
each movable segment is adapted to move with respect to the substrate to change the offset distance;
for each stationary structure, forming a post, wherein:
the stationary structure is rigidly attached to the post and the past is designed to support said stationary structure on the substrate;
the plurality of segments, the springs, and the posts are formed using a first wafer; and
a second wafer comprises the substrate;
forming an open grid structure adjacent to the plurality of segments and the springs using the first wafer;
transferring pressure via the open grid structure to the termini of the posts to bond the first and second wafers; and
removing the open grid structure from the first wafer.

10. The method of claim 9, wherein:
the first wafer comprises three or more layers; and
the plurality of segments and the springs are formed using a single layer of the first wafer.

11. The method of claim 9, wherein at least one of the first and second wafers is a silicon-on-insulator wafer.

12. A method of fabricating a MEMS device, comprising:
forming a plurality of segments, a plurality of spring vertices, a plurality of posts, and a grid structure using a first wafer, wherein the grid structure is adjacent to the pluralities of segments and spring vertices;
bonding the first wafer together with a second wafer using the grid structure; and
removing the grid structure to release the pluralities of segments and spring vertices.

13. The method of claim 12, wherein bonding the first wafer together with the second wafer comprises transferring pressure via the grid structure to the termini of the posts to bond the first and second wafers together.

14. The method of claim 12, further comprising, for each segment, forming a corresponding electrode using the second wafer.

15. A MEMS device, comprising a plurality of movable segments, each segment supported by springs and positioned offset from a substrate, wherein:
each spring is attached between a corresponding stationary structure and a corresponding movable segment, said stationary structure fixed with respect to the substrate;
each movable segment has an outer surface and is adapted to move with respect to the substrate substantially along a normal to the outer surface;
at least one movable segment has a hexagonal shape; and
exactly three springs are attached to the at least one movable segment such that each of the three springs is attached to a different stationary structure.

16. The device of claim 15, wherein the stationary structure rests upon a post supporting said stationary structure on the substrate.

17. The device of claim 15, wherein:
for each movable segment, the device includes a first electrode;
each movable segment is adapted to translate in response to a first voltage applied between the corresponding first electrode and the movable segment, wherein the translation changes the offset distance.

18. The device of claim 17, wherein:
for at least one movable segment, the device includes a second electrode;
the at least one movable segment is adapted to translate and rotate in response to one or more voltages applied between one or more of the first and second electrodes and the at least one movable segment.

19. The device of claim 15, wherein:
the plurality of movable segments and the springs are formed using a first wafer; and
a second wafer comprises the substrate.

20. The device of claim 15, wherein:
the plurality of movable segments are arranged in a substantially contiguous pattern; and
each movable segment has a reflective coating to form a deformable mirror over the contiguous pattern, wherein each movable segment is adapted to move substantially independent of every other movable segment.

21. The device of claim 15, wherein the at least one movable segment is adapted to tilt in any selected direction with respect to a plane defined by said segment at a rest position.

22. The device of claim 21, wherein:
for the at least one movable segment, the device includes at least three electrodes; and
the tilt direction is selected by application of one or more voltages between one or more of the at least three electrodes and the at least one movable segment.

* * * * *